United States Patent [19]

Suzuki

[11] Patent Number: 5,201,394
[45] Date of Patent: Apr. 13, 1993

[54] CLUTCH DISK ASSEMBLY

[75] Inventor: Hiroshi Suzuki, Anjo, Japan

[73] Assignee: Aisin Seiki Kabushiki Kaisha, Kariya, Japan

[21] Appl. No.: 831,063

[22] Filed: Feb. 4, 1992

[30] Foreign Application Priority Data

Feb. 5, 1991 [JP] Japan .................................. 3-35284

[51] Int. Cl.⁵ ............................................... F16D 3/66
[52] U.S. Cl. .................................... 192/106.2; 464/68
[58] Field of Search ........................ 192/106.1, 106.2; 464/68

[56] References Cited

U.S. PATENT DOCUMENTS

| 4,376,477 | 3/1983 | Loizeau | 192/106.2 |
| 4,396,103 | 8/1983 | Loizeau | 192/106.2 |
| 4,433,770 | 2/1984 | Loizeau et al. | 192/106.2 |
| 4,548,308 | 10/1985 | Little | 192/106.2 |
| 4,548,311 | 10/1985 | Lech, Jr. | 192/106.2 |
| 4,563,165 | 1/1986 | Takeuchi | 192/106.2 X |
| 4,614,261 | 9/1986 | Takeuchi | 192/106.2 |
| 4,698,045 | 10/1987 | Billet et al. | 464/68 |
| 4,903,812 | 2/1990 | Fischer et al. | 192/106.2 |

FOREIGN PATENT DOCUMENTS

| 0019526 | 11/1980 | European Pat. Off. . |
| 0165874 | 12/1985 | European Pat. Off. . |
| 2559866 | 8/1985 | France . |
| 2576652 | 8/1986 | France . |
| 2613446 | 10/1988 | France . |
| 2-40125 | 9/1990 | Japan . |
| 2056019 | 3/1981 | United Kingdom ............. 192/106.1 |
| 2103760 | 2/1983 | United Kingdom . |
| 2217432 | 10/1989 | United Kingdom . |

Primary Examiner—Richard M. Lorence
Attorney, Agent, or Firm—Burns, Doane, Swecker & Mathis

[57] ABSTRACT

A clutch disk assembly includes a hub flange, a disk plate disposed on one side of the hub flange, a control plate disposed between the hub flange and the disk plate and elastic device positioned between the hub flange and the control plate for establishing a first stage of the torsion characteristics of the clutch disk assembly. A regulating device in the form of a cam connected to the hub flange regulates relative rotation between the hub flange and the control plate so that upon high speed rotation of the clutch disk assembly, relative rotational movement between the control plate and the hub flange is inhibited and operation of the elastic device ceases.

8 Claims, 6 Drawing Sheets

CLUTCH DISK ASSEMBLY

BACKGROUND OF THE INVENTION

1. Field of the Invention

The present invention relates to a clutch disk assembly and in particular to a clutch disk assembly whose torsion characteristics have a low spring constant area at a first stage for preventing a rattling noise.

2. Description of the Related Art

In general, a clutch disk assembly whose torsion characteristics have a low spring constant area at a first stage for preventing a rattling noise is frequently used in a manual transmission type vehicle. Since it is well known that the low spring constant area is also deemed as a cause of the transient surge or backing which occurs upon acceleration operation during the vehicle's travel, how to concurrently cope with both the rattling noise and the trangient surge is one important problem to be solved.

Figure 9:
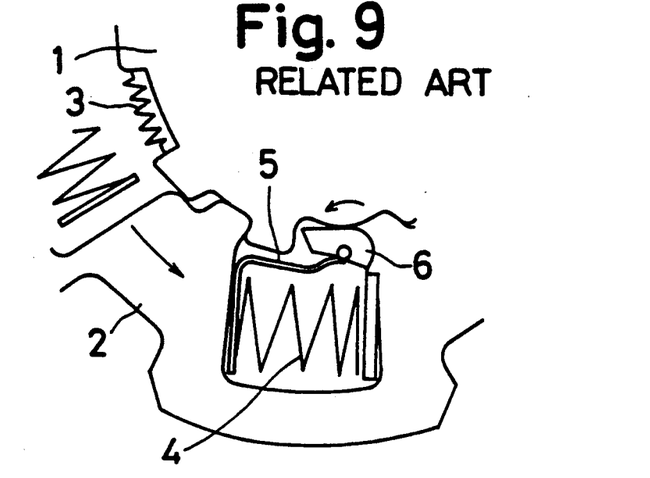
FIGS. 9, 10 and 11 each of which show a portion of the conventional clutch disk assembly.
Figure 10:
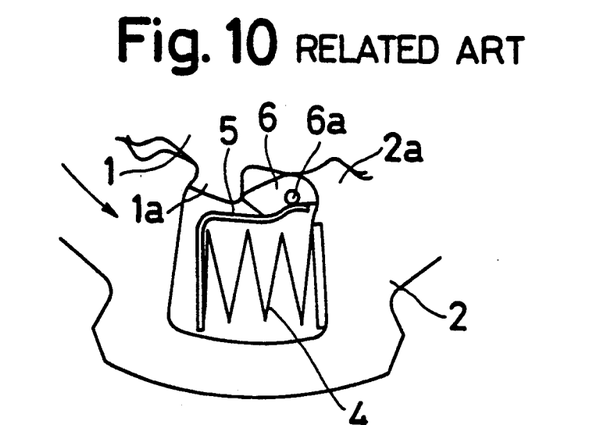

One of the improvements for solving this problem is disclosed in Japanese Patent Publication No. 40125 of 2nd year of Heisei (1989). That clutch disk assembly is shown in FIG. 9 and includes an inner hub 1 and an outer hub 2. Between the hubs 1 and 2, there is interposed a first spring 3 of a low spring constant which constitutes a first stage of the torsion characteristics of the clutch disk. In addition, between the outer hub 2 and a side plate (not shown), a second spring 4 is interposed which constitutes a second stage of the torsion characteristics of the clutch disk.

While a small amount of torque is applied to the clutch disk, the relative rotation between the inner hub 1 and the outer hub 2 is established within an angle in the circumferential direction of the clutch disk, and the first torsion spring is operated or actuated, which constitutes the low spring constant area as a first stage of the torsion characteristics. Thus, the rattling noise upon idle rotation of the clutch disk is prevented.

When the relative rotation between the inner hub 1 and the outer hub 2 proceeds and the foregoing circumferential angle exceeds a certain value as a result of the increased torque, the inner hub 1 and the outer hub 2 are brought into a unitary movement which results in the cessation of operation of the first torsion spring 3. Simultaneously, due to the relative movement between the outer hub 2 and the side plate, the second torsion spring 4 begins to operate, resulting in that the constitution of the spring constant area of the torsion characteristics in order to absorb the inputted torque variation.

At this time, when the second torsion spring 4 is brought into deflexion as a result of the relative rotation between the outer hub 2 and the side plate, a distal end of a receiving extension of the second torsion spring 4 begins to urge or bias a cam 6 for the rotation thereof in the counter-clockwise direction which is disposed between the inner hub 1 and the outer hub 2. That results in the establishment of the locked condition of the inner hub 1 relative to the outer hub 2 due to the mesh engagement between a geared portion 1a and a geared portion 2a.

Under the resulting condition, upon reverse of the torque, the second torsion spring 4 is extended, thereby returning the receiving extension 5 thereof to its original or initial position.

Figure 11:
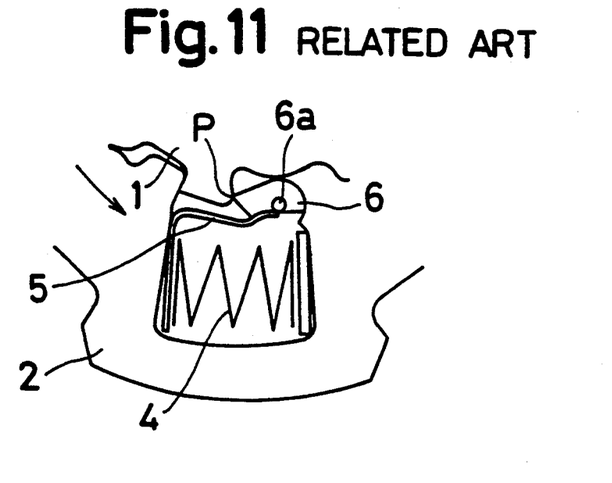

At this time, if the reverse of the torque is performed at a slow speed, the cam 6 is brought into the clockwise rotation due to the urging of the receiving extension 5 of the second torsion spring 4, thereby releasing the locked condition of the inner hub 1 which enables the operation of the first torsion spring 3. Contrary to this, if the reverse of the torque is performed at a high speed under which transient surge or backing may occur, a frictional force at a position p in FIG. 11 between the cam 6 and the geared portion 1a with which the cam 6 is engaged continues to maintain the locked condition between the inner hub 1 and the outer hub 2. Thus, the transient surge or backing can be prevented upon acceleration operation during vehicle's travel.

However, in the foregoing clutch disk assembly, in the case of soft on and off operation of an accelerator, due to the slight deflection of the second torsion spring 4, the rotation of the cam 6 by the movement of the receiving extension 5 of the second torsion spring 4 is not established. Thus, the vehicle continues to travel under the unlocked condition between the inner hub 1 and the outer hub 2, under which the prevention of transient surge or backing can't be attained.

In addition, when a torque in the negative direction is applied to the cam 6 which is in the locked condition, the entire torque is set to be received by a supporting shaft 6a of the cam 6. In light of the fact that the cam 6 is interposed between the inner hub 1 and the outer hub 2, the cam 6 is set to be located at a position of an inner side of the clutch disk. This leads to an excess increase of the load applied to the supporting shaft 6a of the cam 6. Thus, an increase in the rigidity or stiffness of the supporting shaft 6a of the cam 6 is required, and the second torsion spring 4 must be located outside the clutch disk. The resulting arrangement or structure inevitably leads to clutch disk assembly of scaled up size.

SUMMARY OF THE INVENTION

It is, therefore, a primary object of the present invention to provide a clutch disk assembly without the foregoing drawbacks.

It is another object of the present invention to provide a clutch disk assembly which ensures the prevention of rattling and transient surge concurrently without the scaling-up of the assembly per se.

In order to attain the foregoing objects, a clutch disk assembly comprising a hub flange, a control plate disposed at a side portion of the hub flange and elastic means disposed between the hub flange and the control plate for establishing a first stage of the torsion characteristics. Also provided is regulating menas is for bringing the elastic means into an ineffective condition when the clutch disk assembly rotates at a high speed.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DESCRIPTION OF THE PREFERRED EMBODIMENTS

Figure 1:
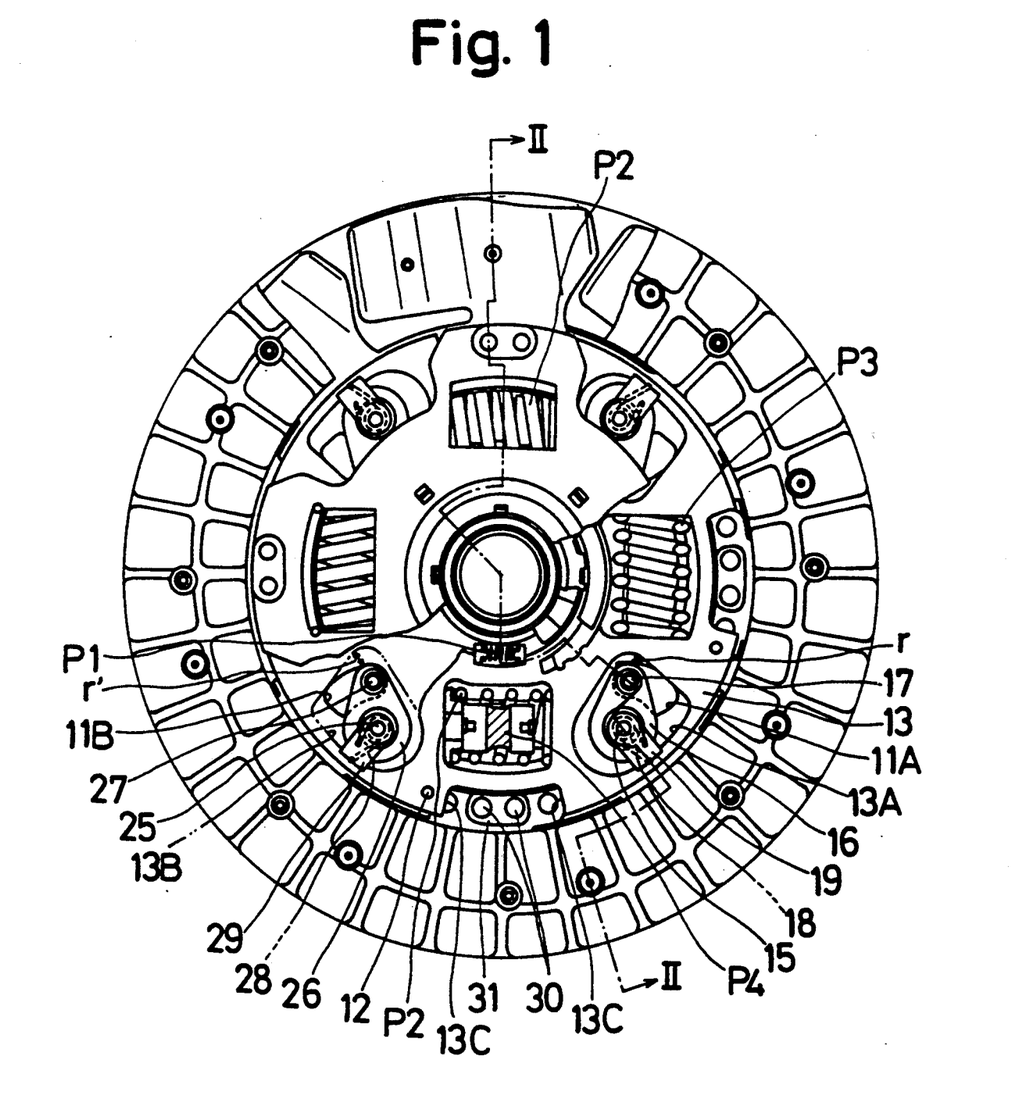
FIG. 1 is a front view of a clutch disk assembly according to an embodiment of the present invention.
Figure 2:
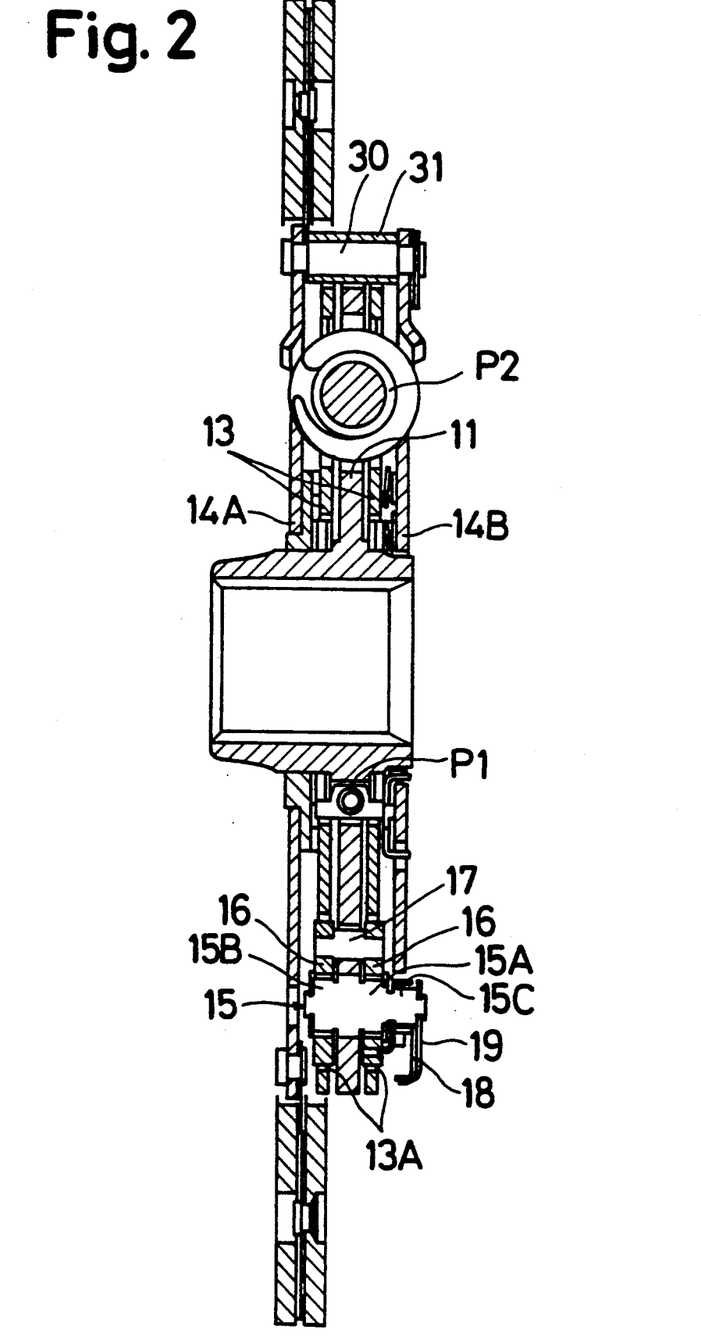
FIG. 2 a cross-sectional view of the clutch disk assembly taken along line II—II in FIG. 1.

Referring to FIGS. 1 and 2, a first stage spring P1 of a low spring constant, which constitutes a first stage of the torsion characteristic of the clutch disk, is disposed between a hub flange 11 and a control plate means comprising a pair of control plates 13 connected by pins 12. The control plates 13 are located outsides the hub flange 11. A second stage spring P2(P3), which constitutes a second stage of the torsion characteristic of the clutch disk, has a larger spring constant than the first stage spring P1 and is disposed within a space defined by the control plate 13, a disk plate 14A and a sub plate 14B. A floating cushion P4 is accommodated within the second stage spring P2 so as to be operated during an operation of the second stage spring P2.

At an outer circumferential side of the hub flange 11, a cam shaft 15 is connected at its central portion to the hub flange 11 after being passed therethrough. Each of the opposite ends 15A and 15B of the cam shaft 15 extends into a corresponding window 13A and a projection 15C which projects from the one end 15A is set to be engaged with a notch of the sub plate 14B.

The cam shaft 15 is connected at its ends 15A and 15B to a pair of spaced cams 16 and 16 so as to be rotated therewith. At an opposed position of the second stage spring P2 with respect to the cam shaft 15, there is formed an arc-shaped guide 11A in the hub flange 11 and distal ends of the cams 16 and 16 are connected to each other by a connecting pin 17 which passes through the guide 11A.

A return spring 18, mounted on the projection 15C of the cam shaft 15, is connected at its one end and the other end to, respectively, the cam 16 and a plate 19 secured to the projection 15C. Thus, each of the cams 16 and 16 is urged continually in the counter-clockwise direction in FIG. 1, thereby engaging the pin 17 with an inner surface of the guide 11A.

As can be understood easily from FIG. 1, the configuration of the window 13A in the control plate 13 is set to be formed for permitting the rotation of the cam 16 within the window 13A as a result of the movement of the pin 17 within the guide 11A. A circumferential gap or clearance r is defined between a distal end of the cam 16 and a side of the window 13A under a condition that the pin 17 is within the guide 11A as shown in FIG. 1, and the distal end of the cam 16 is set to be engaged with the side of the window 13A.

Also, a structure similar to the above-described one is constituted at a portion which is symmetrical thereto with respect to the second stage spring P2. The structure includes a pair of cams 26 and 26, a cam shaft 25, a connecting pin- 27, a return spring 28, a plate 29, a window 13B and a guide 11B which correspond, respectively, to the cams 16 and 16, the cam shaft 25, the connecting pin 27, the return spring 28, the plate 29, the window 13B and the guide 11B. Another gap or clearance r' is formed between the cam 26 and an inner side of the window 13B.

As is apparent from FIG. 1, the clutch disk assembly has two second stage springs P2 AND P2 and the pair of symmetrically disposed cam mechanisms with respect to the second stage spring P2, which reveals that there are two pairs of cam mechanisms in total in the clutch disk device.

The clutch disk device includes a stopper pin 30 which serves for establishing a unitary movement of the disk plate 14A and the sub plate 14B and a stopper block 31 mounted on the stopper pin 30. Due to this structure or construction, a rotation of the control plate 13 relative to the disk plate 14A and the the sub plate 14B brings the stopper block 31 into engagement with a notch 13C formed in the control plate 13. Thus, this structure can act as a stopper of a clutch disk torsion mechanism which is set to prevent the breakage of the clutch disk torsion mechanism.

Figure 5:
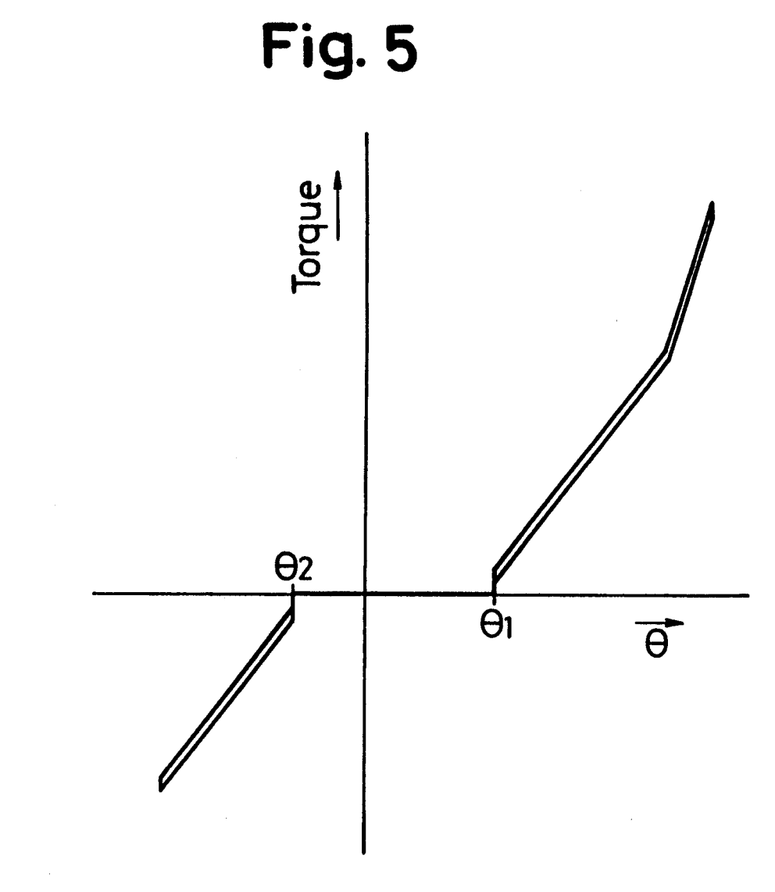
FIG. 5 shows a torsion characteristic while the clutch disk assembly is in operation at a low rotation speed.

While the foregoing clutch disk is in operation at a low rotation speed of 800 rpm, for example, the cam 26 and the cam 16 are being urged or biased in the clockwise direction and the counterclockwise direction, respectively, thereby positioning the cam 26 and the cam 16 inside of the guides 11B and 11A, respectively. Thus, the relative movement between the hub flange 11 and the control plate 13 can be established within an angle of $\theta 1$ in the positive direction which is defined as a positive idle angle due to the gap r' between the cam 26 In addition, relative movement the window 13B and can be established within an angle of $\theta 2$ in the negative direction which is defined as a negative idle angle due to the gap r between the cam 16 and the window 13A. Thus, the operation of the first stage spring P1 is established, thereby constituting the torsion characteristic of the clutch disk which has a first stage as shown in FIG. 5.

Figure 3:
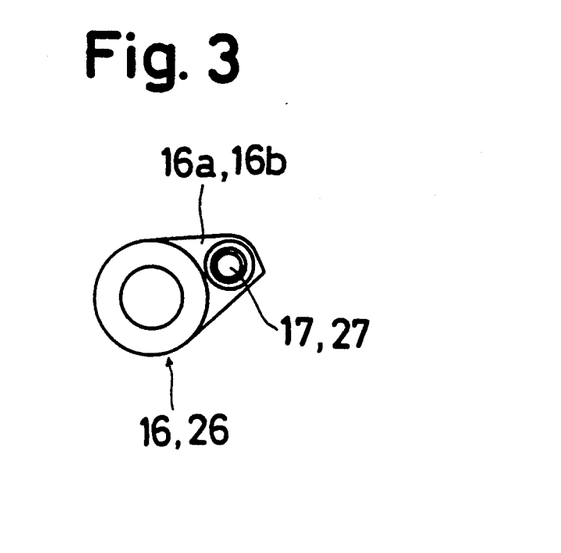
FIG. 3 is an enlarged view for showing the shape of a cam.
Figure 4:
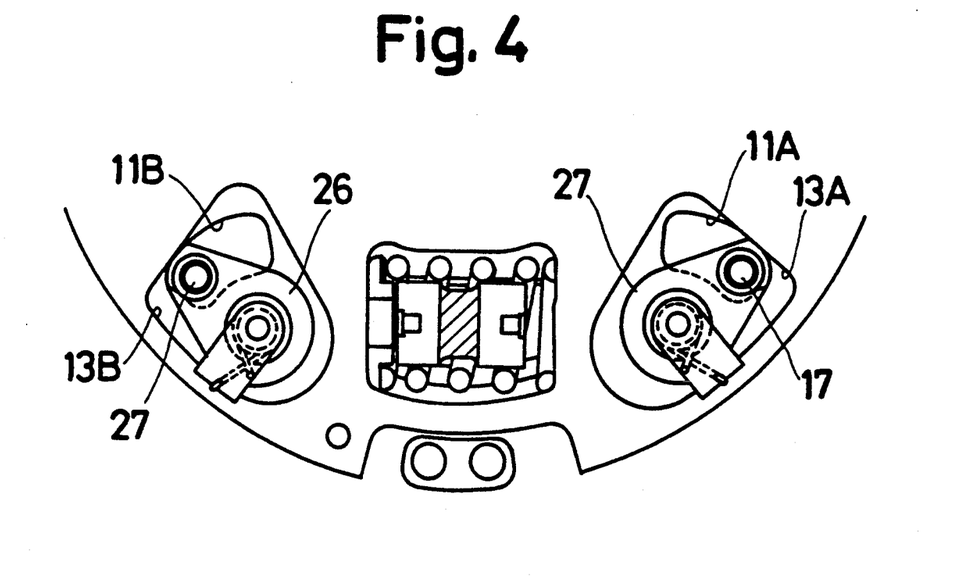
FIG. 4 is an enlarged view of a portion of the clutch disk assembly which is in operation at a high rotation speed.

In addition, if the clutch disk is in a high speed rotation above 1000 rpm for example, due to the centrifugal force applied to an eccentric portion 16a of the cam 16, an eccentric portion 26a of the cam 26 and pins 17 and 27 as shown in FIG. 3, the cam 16 is urged in the clockwise direction in FIG. 1 against the return spring 18 and the cam 26 is urged in the counter-clockwise direction in FIG. 1 against the return spring 28. As a result the connecting pins 17 and 27 are transfered to the outside portions of the guides 11A and 11B, respectively, after movements therealong.

Figure 6:
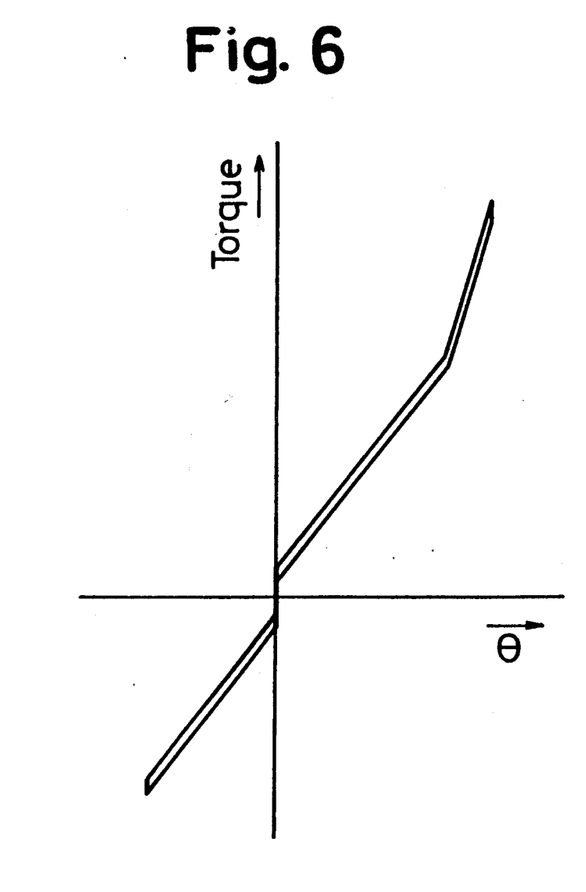
FIG. 6 is a graph showing torsion characteristics of the clutch disk assembly.

Thus, the engagements of the distal ends of cams 16 and 26 with the sides of the windows 13A and 13B respectively brings the locked condition under which the unitary connection of the hub flange 11 to the control plate 13 is established, thereby preventing the relative rotation therebetween. Consequently, due to malfunction of the first stage spring P1, the clutch disk torsion characteristic forms a graph which no first stage characteristic is reflected as shown in FIG. 6.

Figure 7:
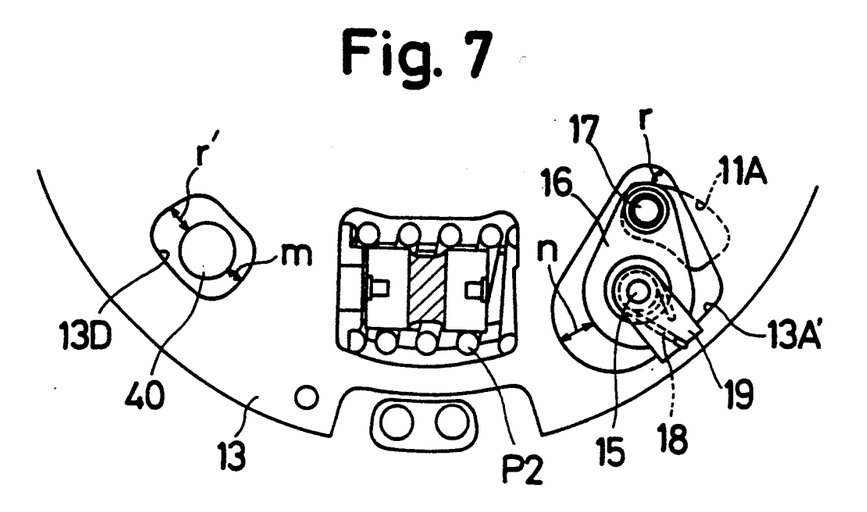
FIG. 7 and FIG. 8 are enlarged views of a portion of another clutch disk assembly according to a second embodiment of the present invention which is in operation at low and high rotation speeds.

FIG. 7 shows another embodiment of the clutch disk device in accordance with the present invention in which a single cam mechanism is provided at one side of the second stage spring P2 as compared to the are pair of cam mechanisms are provided at both sides of second stage springs P2.

In FIG. 7, the cam mechanism is positioned at a counter-clockwise side of the second stage spring P2 and includes the cam 16, the cam shaft 15, the return spring 18, the plate 19, connecting pin 17 and guide 11A. The cam mechanism is similar to that of the foregoing embodiment in construction and mounting except that the former is so shaped as to incline to the cam 16 for establishing the closure of a portion of the guide 11A by a side of a window 13A'.

Under a condition as shown in FIG. 7, the gap r is defined between the distal end of the cam 16 and the side of the window 13A' for ensuring the negative idle angle $\theta 2$ and another gap n is defined between the rear end of the cam 16 and the other side of the window 13A' for ensuring the positive idle angle ($\theta 1 + \alpha$).

At an opposite side of the cam 16 with respect to the second stage spring P2, a pin 40 is fixedly mounted to the hub flange 11 in such a manner that the pin 40 passes the hub flange 11 in the axial direction thereof, and each end of the pin 40 extends into a window 13D of the corresponding control plate 13. Under a condition as shown in FIG. 7, the gap r' is defined between the pin 40 and the clockwise side of the window 13D for ensuring the positive idle angle $\theta 1$ and another gap m is defined between the pin 40 and the other side of the window 13D' for ensuring the negative idle angle ($\theta 2 + \alpha$).

In this embodiment, while the clutch disk assembly is in a low speed rotation, as shown in FIG. 7, the cam 16 is positioned at an inner side of the guide 11A as a result of the biasing of the return spring 18, and the relative rotation between the hub flange 11 and the control plate 13 can be established within an angle range of $\theta 1$ ($\theta 2$) in the positive (negative) direction due to the gap r' between the pin 40 and the window 13D (the gap r between the cam 16 and the window 13A'). Thus, as a result of the operation or activation of the first stage spring P1, the torsion characteristic can be established similar to that shown in FIG. 5.

Figure 8:
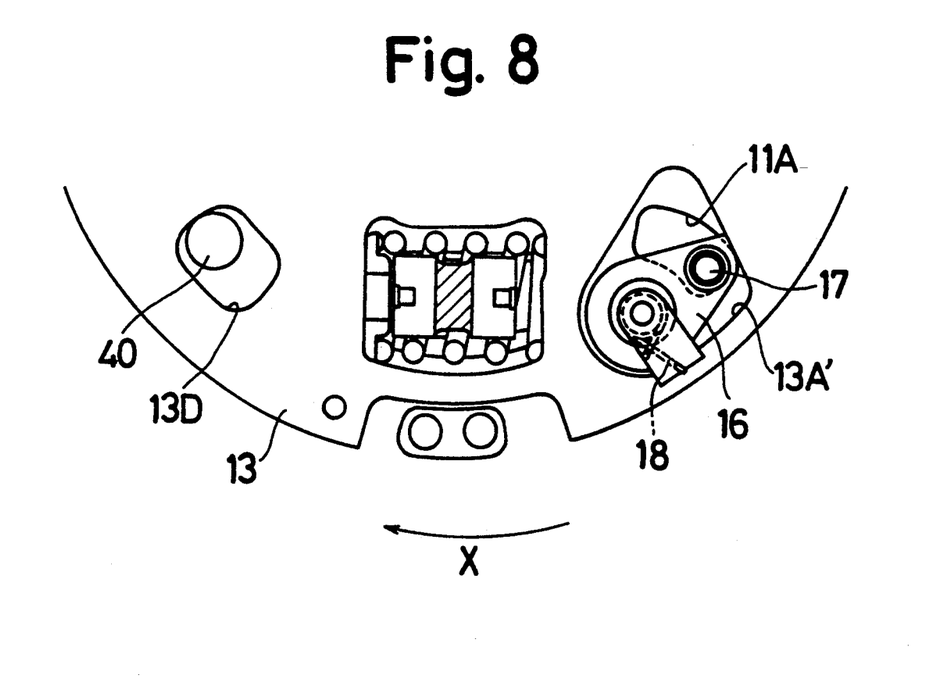

As the rotation speed of the clutch disk becomes high, due to the torque load on the clutch disk caused by the acceleration operation, as shown in FIG. 8, the movement of the hub flange 11 in the x direction relative to the control plate 13 vanishes the gap m and increases the gap r'.

At this time, the centrifugal force brings the eccentric distal end of the cam 16 to the outer circumferential portion of the guide 11A, thereby establishing the vanishment of the increased gap r' and the locked condition between the hub flange 11 and the control plate 13. Thus, the torsion characteristic without the first stage characteristic can be realized or established.

It is noted that with respect to the second stage spring P2 the positions of the cam 16 and pin 40 are replaceable with each other.

Though, in each of the foregoing embodiments, the explanation has been established on the assumption that the control plate and the hub flange are locked perfectly during the rotation of the clutch disk at a high speed, another design can be proposed in such a manner that the gap can be left slightly between the distal end of the cam and the control plate upon rotation of the cam while the clutch disk is in high speed rotation. However, in such case, the the gap should be set carefully. The reason is that the first stage area of the torsion characteristic appears depending on the allowed gap.

As detailed above, according to the present invention, the first stage elastic member is prevented from being operated due to the locking of the hub flange and the control plate which is established for preventing the relative movement therebetween by the rotation of the cam as a result of the centrifugal force caused by the clutch disk. so long as the rotation speed of the clutch disk is kept above a value such as 1000 rpm, despite any acceleration operation, the cam can be always kept at its locked condition and the first stage area can't appear in the torsion characteristic of the clutch disk.

Thus, during the vehicle's travel, transient surge or backing upon acceleration operation can be prevented perfectly.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A clutch disk assembly possessing torsion characteristics comprising: a hub flange; a disk plate disposed on one side of the hub flange; a control plate disposed between the hub flange and the disk plate; elastic means positioned between the hub flange and the control plate for establishing a first stage of the torsion characteristics of the clutch disk assembly; and regulating means for regulating relative rotation between the hub flange and the control plate so that upon high speed rotation of the clutch disk assembly, relative rotational movement between the control plate and the hub flange ceases and operation of the elastic means ceases, said regulating means including a cam connected to the hub flange.

2. The clutch disk assembly according to claim 1, wherein said control plate has a window in which is positioned said cam, said cam including an eccentric portion, said eccentric portion being out of contact with portions of the control plate surrounding said window during relatively low speed rotation of the clutch disk assembly and being in contact with a portion of the control plate surrounding the window during high speed rotation of the clutch disk assembly to thereby lock the control plate relative to the hub flange.

3. The clutch disk assembly according to claim 1, including a disk plate disposed on each side of the hub flange, a control plate disposed between the hub flange and each disk plate, and first and second pairs of circumferentially spaced cams, each cam having an eccentric portion, each of the control plates having two windows formed therein, one of the cams being positioned in each of the windows, and including a spring connected to each pair of cams for urging the eccentric part of each cam out of engagement with portions of the respective control plates surrounding the respective windows.

4. The clutch disk assembly according to claim 3, wherein the eccentric portion of the cams comprising the first pair are connected to one another by a pin which extends through an arc-shaped guide opening in the hub flange and the eccentric portion of the cams comprising the second pair are connected to one another by a pin which extends through another arc-shaped guide opening in the hub flange, the spring urging the eccentric portion of each cam toward circumferential inner sides of the respective guide so that a gap is defined between an inner periphery of the respective window and a distal end of the respective eccentric portion.

5. The clutch disk assembly according to claim 1, wherein the cam includes an eccentric portion, and including an arc-shaped guide slot formed in the hub flange for guiding a distal end of the eccentric portion.

6. The clutch disk assembly according to claim 5, including a window formed in the control plate for receiving the eccentric portion, and a spring connected to the cam for urging the eccentric portion out of engagement with portions of the control plate surrounding the window so that a gap exists between an inner periphery of the window and a distal end of the eccentric portion.

7. The clutch disk assembly according to claim 6, including a pin connected to the hub flange and extending toward the control plate, and a pin opening formed in the control plate through which the pin extends, portions of the control plate surrounding the pin opening being spaced from the pin, a distal end of the eccentric portion being spaced from a side of the window when the eccentric portion of the cam is at an inner side of the guide slot and the distal end of the eccentric portion being in contact with a side of the window when the eccentric portion of the cam is at an outer side of the guide slot.

8. The clutch disk assembly according to claim 1, wherein said cam includes an eccentric portion that is positioned in a window formed in the control plate, and including a spring for urging the eccentric portion out of contact with portions of the control plate surrounding the window during relatively low speed rotation of the clutch disk assembly, said cam overcoming the urging force of the spring during high speed rotation of the clutch disk assembly so that the eccentric portion moves into contacting engagement with a portion of the control plate surrounding the window to thereby lock the control plate relative to the hub flange.

* * * * *